United States Patent [19]

Nausedas et al.

[11] Patent Number: 4,627,130
[45] Date of Patent: Dec. 9, 1986

[54] ROTATABLY DRIVEN CORED CASING ARTICLE

[75] Inventors: Joseph A. Nausedas, Oak Forest; Michael P. Kazaitis, Chicago, both of Ill.

[73] Assignee: Union Carbide Corporation, Danbury, Conn.

[21] Appl. No.: 566,828

[22] Filed: Dec. 29, 1983

[51] Int. Cl.$^4$ .............................................. A22C 13/00
[52] U.S. Cl. ........................................... 17/1 R; 17/41
[58] Field of Search ............... 17/33, 34, 35, 45, 49, 17/41; 53/576, 581, 585

[56] References Cited

U.S. PATENT DOCUMENTS

| | | | |
|---|---|---|---|
| 1,043,241 | 11/1912 | Louden, Sr. | |
| 1,302,194 | 4/1919 | Mayer | |
| 2,168,693 | 8/1939 | Walter | 17/33 |
| 3,115,668 | 12/1963 | Townsend | 17/33 |
| 3,264,679 | 8/1966 | Moekle | 17/33 |
| 3,779,284 | 12/1973 | Tums | 17/42 |
| 3,826,853 | 7/1974 | Levaco | 426/132 |
| 3,835,503 | 9/1974 | Townsend et al. | 17/35 |
| 3,873,744 | 3/1975 | Townsend et al. | 426/284 |
| 3,952,370 | 4/1976 | Greider | 17/42 X |
| 3,964,128 | 6/1976 | Townsend et al. | 17/33 |
| 3,964,236 | 6/1976 | Smith | 53/122 |
| 4,358,873 | 11/1982 | Kollross | 17/33 |

Primary Examiner—Willie G. Abercrombie
Attorney, Agent, or Firm—Roger Aceto

[57] ABSTRACT

A casing article for use in automatic production of frankfurters and the like includes a tubular core and a shirred casing stick carried by the core. The core can function as a disposable stuffing horn and, for this purpose, it has one end receivable in the discharge of the stuffing machine including a flange which is engaged and rotated by a rotating chuck of the stuffing apparatus. Also disclosed are modifications to the stuffing machine to make the machine compatible with the casing article, an end-of-casing monitor, a carrier for moving the casing article to a stuff position and a method for operating the stuffing machine to stuff out the casing and produce linked frankfurters.

29 Claims, 5 Drawing Figures

ROTATABLY DRIVEN CORED CASING ARTICLE

RELATED APPLICATIONS

U.S. Pat. No. 4,489,460 issued Dec. 25, 1984 and U.S. patent application Ser. No. 566,787, now U.S. Pat. Nos. 4,545,091, and 566,786, both filed Dec. 29, 1983 and U.S. patent application Ser. No. 583,317 filed Feb. 24, 1984 are related to this application.

BACKGROUND OF THE INVENTION

The present invention relates generally to a casing article and, more particularly, to a cored casing article and to an apparatus and method adapted to utilize the article in a stuffing operation.

Tubular casing articles and apparatus, as may be used for the high speed automatic production of encased food products, such as frankfurters or the like, are well known in the art. Such automatic high speed production requires that relatively long lengths of casing be supplied to the stuffing apparatus. It is conventional to supply the casing in the form of a compacted shirred tubular casing article called a "shirred stick." It is not uncommon for a shirred stick measuring 20 inches in length to contain upwards of 160 feet of casing. The sticks, which are coherent and resistant to breakage, can be handled by the mechanical loading apparatus of a stuffing machine. Conventional apparatus for stuffing and linking this entire casing length in less than a minute is also known in the art, one such apparatus being described in U.S. Pat. No. 3,115,668.

The present invention concerns an improved casing article. An improved stuffing apparatus and method as may utilize this improved casing article also is disclosed, the apparatus in particular being of the general type as disclosed in said U.S. Pat. No. 3,115,668.

The improved casing article of the present invention includes a substantially rigid tubular core member disposed within the bore of the casing stick. It is sufficient for purposes of the present invention that the inner periphery of the casing stick be in contact about the outer periphery of the tubular core, preferably over the full length of the casing stick. Moreover, this contact should be sufficient to provide a resistance to relative motion between the core and the casing stick. The core also should have as thin a wall as possible, yet be able to withstand the stresses generated by the casing being in contact about the core. In other words, the tubular core must not be so thin walled or weak as to buckle under the casing generated stresses. The core should also be strong enough to withstand the internal pressures exerted on the core by the food emulsion passing through the core during the stuffing operation.

Various advantages are exhibited by cored casing articles. For example a cored casing article has a greater coherency, that is, a greater ability of the stick to resist breaking than a conventional shirred casing stick which does not have a tubular core member. Resistance to breaking renders the casing article better able to resist the rigors of manual handling and of automatic handling by the stuffing apparatus.

Another advantage is that, due to the physical support offered by the core, a cored article can contain a greater length of casing than an uncored article. This is a very desirable feature in automatic stuffing operations since greater casing lengths translate to faster production and less machine downtime while a new casing article is being loaded into stuffing position.

Also, with longer casings there are fewer casing ends to deal with. This reduces labor involved in both tying stuffed casing lengths together for subsequent processing, and in removing food product from any malformed end links. With fewer ends to tie, the amount of waste casing is reduced, the amount of food product rework is reduced and, in general, the yield is increased by the resulting increase in the number of stuffed links produced per shirred stick.

In any event, for purposes of the present invention, the shirred stick on the core preferably is in contact about the outer periphery of the core over substantially the full length of the stick. This contact is sufficient to provide a resistance to relative motion between the core and shirred stick so the stick tends to stay fixed to the core as casing is deshirred from the stick.

Another advantage of cored casing articles is that the core itself can function as a stuffing horn and in particular as a disposable, one-use stuffing horn. Here, the core would have an aft end attachable to the discharge of the stuffing machine and a fore end from which the food product exits for introduction into the casing.

Accordingly, the apparatus as described herein is provided with components which interface with the cored casing article of the invention to permit the core to function as the stuffing horn of the apparatus, and in particular, as a rotating stuffing horn. Thus, one aspect of the invention involves providing means on the core which is engageable by a complementary rotary drive means of a stuffing machine to rotate the core about its longitudinal axis and take up the thrust load on the core caused by the emulsion pressure.

These and other advantages, objects, and characterizing features of the present invention will become more apparent upon a consideration of the following detailed description thereof, which is directed to a cored casing article having an improved core configuration to permit its use by an automatic stuffing machine, together with an improved rotating drive chuck assembly, clutch and discharge configuration for the machine to permit utilization of the improved cored article.

SUMMARY OF THE INVENTION

The cored casing article of the present invention may be characterized in one aspect thereof by an elongated substantially rigid tubular core for supporting a tubular shirred casing stick, the core and shirred stick being in sufficient contact to provide a resistance to relative motion therebetween so that rotation of the core will also rotate the casing, wherein the core comprises engaging means on its aft end for driving engagement by a rotational force. In a preferred embodiment, the engaging means is a flange which is oriented in a plane generally perpendicular to the longitudinal axis of the core. The flange has a shape which permits coupling of the flange to a drive at the stuffing machine discharge. In a preferred embodiment the flange is a circular member having flat faces, at least one of the faces having a ratcheted configuration which presents at least one radially and axially disposed abutment surface. Each abutment surface is adapted to be engaged by a rotary drive means for rotating the core about its longitudinal axis.

DESCRIPTION OF THE PREFERRED EMBODIMENTS

Figure 1:
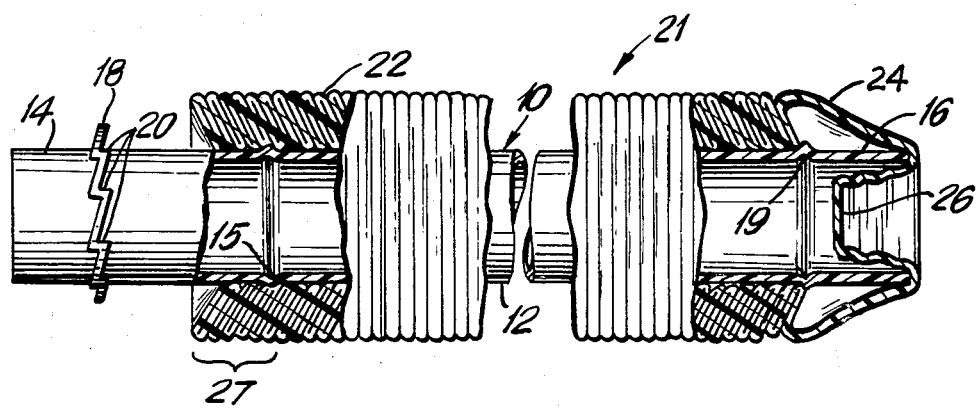
FIG. 1 is a view, partly broken away and in section, of the cored casing article of the present invention.

Referring to the drawings, FIG. 1 shows the tubular core 10 of the present invention as may function as a disposable stuffing horn. The core consists of an elongated tubular body 12 of substantially straight cylindrical form and has an aft end 14 and a fore end 16. The core is preferably made of a relatively inexpensive material having a high creep strength such as polyvinylchloride which lends itself to the fabrication of disposable, single use items.

On an aft end portion 14 of core 10 is an engagement means 18. The engagement means comprises a flange oriented in a plane generally perpendicular to the longitudinal axis of the core. One or both upright faces of the flange includes a plurality of ratchet steps 20.

As will be described hereinbelow, these ratchet steps 20 provide radially and axially disposed abutment surfaces which are engageable and driven by the rotating drive of the stuffing machine for rotating the core. In this context, then, other possible shapes or configurations of driven members on the core, which would complement the shape of a rotating drive of the stuffing machine, would be readily apparent to one skilled in the art.

There is shown in FIG. 1, a casing article generally indicated at 21, utilizing the core 10. In this respect, the core is shown as carrying a supply of casing in the form of a shirred stick 22.

Techniques for forming a conventional shirred stick 22, that is one without a core, are well known in the art and will not be described in detail. It is sufficient for purposes of the present invention merely to say that it involves a shirring process wherein a relatively long length of casing is shirred about a mandrel by any one of several conventional techniques to produce a relatively short shirred stick.

Still further length reduction can be accomplished by subjecting the shirred stick to an axial force so as to compact the pleats formed by shirring. The end result is that it is not uncommon in the art to have a shirred stick which is only about 1% of the length of the unshirred casing, that is, a shirred stick 22 measuring one foot in length may contain 70 to 100 or more feet of casing.

There are various ways of providing the compacted casing or stick with a core. For example, the stick can be doffed from the mandrel and onto a core to provide the cored casing article 21. As an alternative, the shirred casing can be transferred to the core and compacted while on the core. Other ways of providing the casing with a core should be readily apparent to one skilled in the art.

For purposes of the present invention, the contact and engagement of the casing about the core should be sufficient to resist relative motion between the shirred stick and core. This will permit the stick to spin with the core. That is, any rotation of the core about its longitudinal axis should result in a like rotation of the shirred stick so that the entire casing article 21 can rotate as a unit.

In the article as shown in FIG. 1, the shirred stick is arranged so that the last pleats of casing shirred, that is those adjacent fore end 16, are the first to deshirr when the casing is stuffed. This is the opposite of more conventional stuffing techniques when using uncored articles wherein the first casing shirred is also the first casing to be deshirred.

The reason for this preferred opposite convention when using cored articles of the type described herein, is that it permits pleats to deshirr from the stick without the possibility of tearing any pleat which may be pinched to the core by adjacent pleats in the stick.

In any event, after the shirred stick is loaded onto the tubular body 12 of the core, a portion of the casing adjacent the fore end of the tubular core is deshirred as shown at 24 and pulled forward over the fore end 16. This deshirred portion of casing is formed into an end closure 26 which is positioned to plug the bore opening of the tubular core. Such end closures for uncored articles and the method and apparatus for effecting such an end closure are well known in the art and may be readily adapted for use with cored articles of the type described herein. By deshirring and pulling the casing over the fore end of the tubular core and then positioning the casing plug 26 in the bore opening, FIG. 1 shows that a closed annular air space of substantial length is formed. This air space is defined between the outer periphery of the tubular core fore end 16 and the deshirred portion 24 of the casing. One end of the closed annular air space is defined by the pleats of shirred casing which grip the tubular core. The other end of the closed annular air space is defined by the portion of deshirred casing which contacts against the tubular core at the fore end as it passes into the bore of the core.

FIG. 1 also shows the tubular body 12 as having a raised rib 15 formed adjacent its aft end 14. This rib preferably is formed after shirred stick 22 is in place on the core. The function of rib 15 is to insure that the pleats of an aft end portion 27 of the shirred stick, which is located aft of the rib 15, remain at a fixed location on the core until all of the casing in pleats forward of the rib has been deshirred by the forward extension of casing from the stick.

It should be apparent that as casing deshirrs from the stick, the stick gets shorter. As the stick gets shorter, the resistance to relative axial motion between the core and a remainder of the shirred casing in the aft end portion of the stick decreases. It is likely, that at some point, the resistance to relative motion, as provided by the contact between the core and an aft end remainder portion of the stick, will be less than the force required to deshirr casing from the stick. When this happens the remainder portion will break free of the core and begin to move longitudinally along the core towards the fore end 16 responsive to the deshirring force.

The longitudinal movement of this remainder could prematurely initiate termination of the stuffing operation. Consequently, rib 15 provides a barrier to delay any longitudinal movement or deshirring of the portion 27 of the stick until after all of the casing forward of this rib has been deshirred from the stick.

Preferably a second raised rib 19 is formed adjacent the fore end of the core. This rib 19 is positioned ahead of the shirred stick and functions to prevent a slug of shirred casing from moving along the core and over the fore end 16 responsive to the force applied to deshirr from the stick. Another function of this rib 19 will be mentioned hereinbelow in connection with the operation of a stuffing machine using the cored casing article described herein.

In a preferred embodiment, casing article 21 will include features of a so called "cored high density" article. Cored high density articles per se are subjects of a copending application Ser. No. 363,851, the disclosure of which is incorporated herein by reference so that such articles are not described in detail herein. However, by way of illustrating a preferred embodiment of the present invention, an example of a preferred casing article, including cored high density features and its method of manufacture, is described hereinbelow.

Briefly, one feature of a cored high density article is that it contains a longer length of casing for the same shirred length and is more highly compacted than conventional, uncored casing articles. The high degree of compaction considerably increases the forces exerted on the core due to the inherent resiliency of the highly compacted casing and its tendency to expand inwardly upon the core as internal stresses within the stick relax with time to an equilibrium condition with the core.

Production of a casing article 21 having cored high density features may begin with a conventional shirring step wherein a conventional cellulosic casing, as may be used in the manufacture of frankfurters, is shirred on the mandrel of a shirring machine in a conventional manner by any one of several shirring methods. A preferred shirring method is the subject of U.S. Pat. No. 3,779,284, the disclosure of which is incorporated herein by reference. Typical cellulosic casings of this type may have a stuffed diameter of about 0.81 inches, a wall thickness of about 0.001 inches and a moisture content of between about 12-16% and preferably, at least about 13% by weight.

A conventional shirred stick, of such casing might contain about 160 feet of casing. For purposes of the present invention, it is preferred that the shirred stick contain about 250-285 or more feet of casing.

A shirring, the stick undergoes a compaction step which further reduces its length. Compaction methods are known and, in general, involve placing the shirred stick on a mandrel having a desired outside diameter, and then moving a compaction arm against one end of the stick to compress it up against a restraint. This compacts the stick while maintaining a desired bore size.

In a preferred compaction method, as disclosed in a copending application Ser. No. 436,057, compaction arms are simultaneously moved against both ends of the shirred stick to simultaneously move and compress both ends of the stick towards the middle. This method was found to facilitate compaction and to permit a relatively high degree of compaction with a relatively low compaction force.

Compaction of 285 feet of casing to a length measuring about 19 inches results in a pack ratio of about 180. "Pack Ratio" is a term of art and is simply the unshirred casing length in inches divided by the final compacted length in inches.

After compaction, the shirred stick is doffed from the mandrel and onto the tubular core 10 of the casing article. Preferably, the shirred stick is loaded onto the core over the fore end 16 and pushed along the core towards flange 18.

It is well known that a shirred stick is resilient and will tend to expand axially as soon as the compressive forces are relaxed and restraints on the compacted casing are relieved. The bore of the shirred stick will also begin to grow smaller in diameter as the stick expands radially inward into the volume previously occupied by the mandrel. Accordingly, the core must have a high creep strength to resist the forces generated by the resilient shirred stick.

Also, to facilitate transfer of the shirred stick to the core, the outside diameter of the core should be slightly less than the outside diameter of the mandrel on which the strand of shirred casing is compacted. For example, for a typical size of frankfurter casing, it was found that the shirred stick can be doffed from the mandrel having a 0.510 inch outside diameter onto a core having an outside diameter of 0.500 inches.

An example of a tubular core which is able to resist the forces generated by the shirring and compacting of 285 feet of casing to a 19 inch stick is one made of rigid polyvinyl chloride, about 22¾ inches long and having an inside or bore diameter of about 0.450 inches and a wall thickness of about 0.025 inches.

After placement on the core, there is some axial growth of the shirred stick so that a final pack ratio may drop from the original compressed pack ratio of 180 to about 159-160. Also, there may be a reduction of bore size of the core. That is the shirred stick may exert a radial inward force on the core sufficient to cause the inside diameter of the core to decrease from about 0.450 inches to about 0.440 inches.

After the shirred stick is loaded onto the core, rib 15 and, if desired, rib 19 are formed. These ribs can be cold formed by inserting a tool into the bore of core 12 and then operating the tool to raise the ribs. Neither rib 15 nor rib 19 need be very large to function. For example, with the size core and casing as described herein, a rib 15 about 0.03 inches high will be sufficient to function as a deshirring control means. Preferably, the forward rib 19 is larger as it may perform an additional function as further described herein below.

About 10-14 inches of the casing is then deshirred and drawn over the fore end of the core. This deshirred casing is formed into a plug 26 and inserted into the bore of the tubular core as shown in FIG. 1.

Thus, a preferred cored high density casing article of the type shown in FIG. 1, with frankfurter size casing, would contain about 285 feet of casing and measure about 22¾ inches from one end of the core to the other. This is in contrast with a more conventional, i.e. uncored, shirred stick for the same size of casing, which measures about 20½ inches in length and contains only about 160 feet of casing. The bore size of the preferred article of about 0.440 inches would be comparable to the inside diameter of a stuffing horn as may accommodate the more conventional uncored shirred stick.

Figure 2:
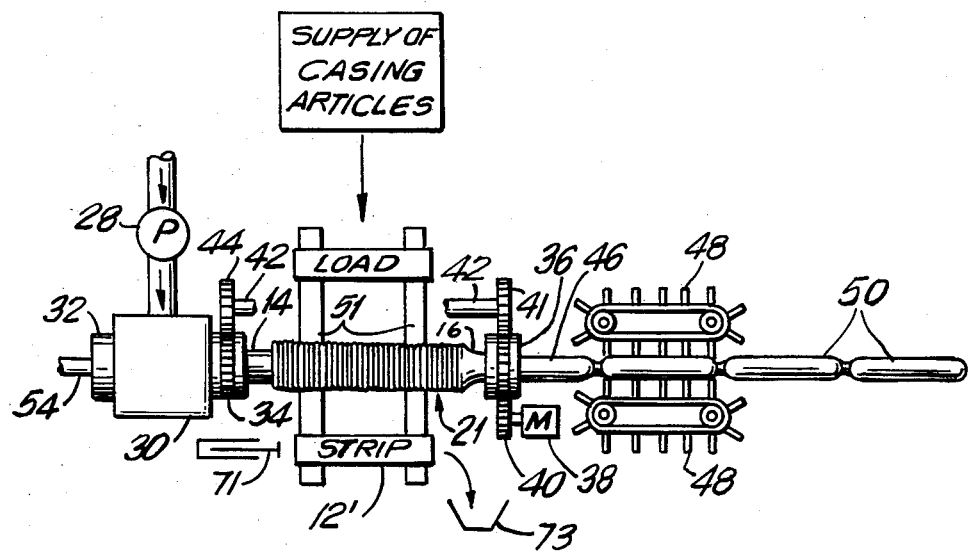
FIG. 2 is a schematic representation of a stuffing machine as may utilize the casing article of the present invention.

Referring to FIG. 2, there is shown, diagramatically, components of a stuffing machine as may employ the casing article 21 of FIG. 1. The stuffing machine is preferably a type as described in U.S. Pat. No. 3,115,668 except as modified as described herein, which is used in the production of frankfurters, or the like. Reference is made to that patent for a more detailed description as to the function and operation of components not herein described.

Briefly, for the purpose of the present invention, it is merely sufficient to say that the machine includes a pump 28 which is connected to a source of food product (not shown). The discharge of the pump is connected to a manifold chamber 30, including a sliding valved conduit 32.

The sliding conduit 32 includes an aft drive chuck 34 which connects to the aft end 14 of the tubular core for rotating the casing article 21 about a longitudinal axis. The fore end 16 of the casing article 21 is received in a forward chuck 36 which is driven by a drive motor 38 through a spur gear 40. A second gear 41, which is driven by forward chuck 36, is connected through shaft 42 and gear 44 to aft drive chuck 34 so that both chucks 34 and 36 rotate in the same direction and at the same speed.

The casing is stuffed by emulsion emerging from the core. The stuffed casing 46 passes through chuck 36 and is engaged and rotated by the chuck. From chuck 36, the rotating stuffed casing passes through a linker mechanism indicated at 48 which links the stuffed casing into individual links 50 in a conventional manner.

For purposes of the present invention, those components of the stuffing apparatus which interface with casing article 21 are described hereinbelow. These components, in particular, include the aft drive chuck 34 for receiving the aft end 14 of the casing article, and the forward chuck 36 which is adapted to receive the fore end 16 of the casing article. These components are shown in further detail in FIG. 3.

Figure 3:
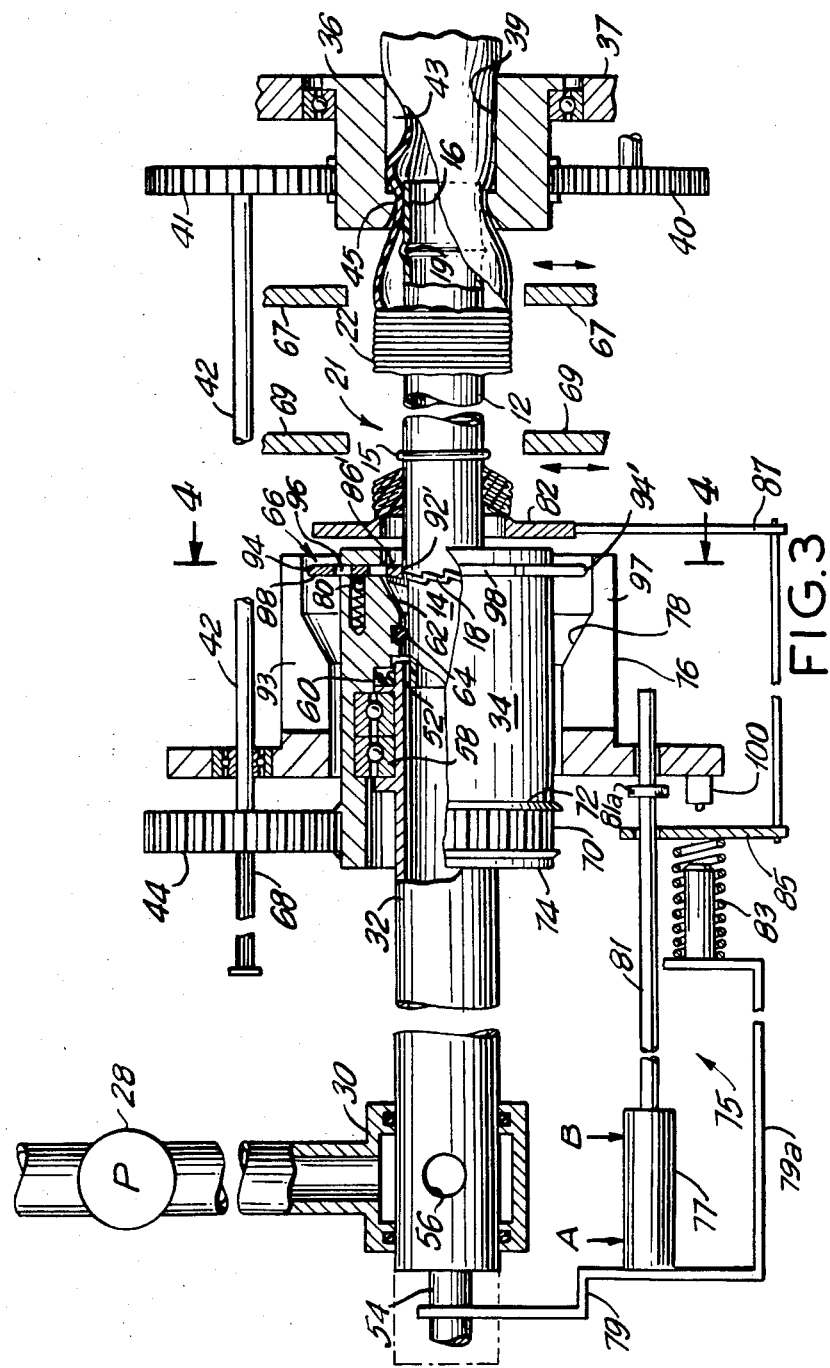
FIG. 3 is a view, partly broken away and in section, of components of the stuffing machine in operative association with the casing article of the present invention.

Referring to FIG. 3, the aft end 14 of the casing article 21 is shown in operative association with aft drive chuck 34 and in communication with the discharge 52 of the sliding valved conduit 32. The conduit 32 is a reciprocating member driven by a piston rod 54 connected to any suitable drive means, not shown. As set out hereinabove, the conduit slides through manifold 30 which is attached to the discharge of pump 28.

The sliding conduit 32 has a port 56 in the wall thereof. In the position shown in FIG. 3, the opening aligns with manifold 30 to permit food product in the manifold to enter the conduit. When the conduit 32 is moved to the left, to a position shown in phantom line, in FIG. 3, port 56 is out of registry with the manifold so that food product cannot pass into the conduit. Thus, sliding conduit 32 functions as a valve to control the flow of food product into the conduit and though its discharge 52.

Mounted on the conduit adjacent discharge 52, is the inner race of a bearing 58. The outer race of this bearing mounts the aft drive chuck 34 so that the chuck can rotate with respect to the conduit. Between the aft drive chuck 34 and the conduit is a pressure seal 60. This seal prevents food emulsion from leaking between the conduit and the aft drive chuck.

Aft drive chuck 34 has a tapered inlet 62 to facilitate the introduction of the core aft end 14 into the chuck and conduit. An inboard seal 64 on the rotating chuck provides a static seal between the chuck and the aft end 14 of the core and prevents the escape of food emulsion from between the chuck and core.

Carried by drive chuck 34 and arranged about its tapered inlet 62, is a centrifugal clutch generally indicated at 66. This clutch, as will be described further hereinbelow, engages and rotates the core when aft drive chuck 34 is rotated. The clutch also functions to take up the thrust exerted on the core during the stuffing operation and prevents the core from moving forward responsive to the forces exerted by the food emulsion being pumped through the core.

Aft drive chuck 34 is driven from drive shaft 42 by a spline 68 on the drive shaft, a spur gear 44 slidably carried by the spline, and a ring gear 70 on the aft drive chuck which is meshed with spur gear 44.

In addition, it should be noted that the spur gear 44 is captured to the ring gear by an annular rib 72 of the drive chuck on one side of the spur gear and a retaining washer 74 on the other side of the spur gear. With this arrangement the fore and aft movement of conduit 32 will cause a corresponding movement of spur gear 44 along the spline 68 of shaft 42.

Figure 4:
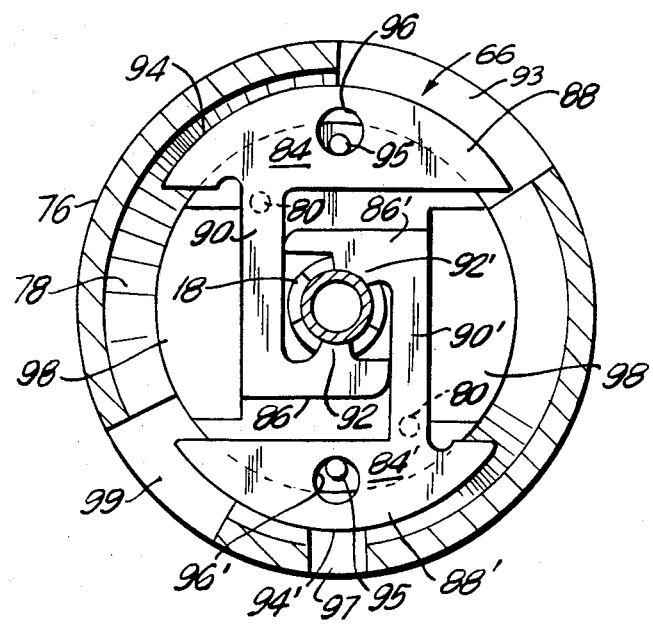
FIG. 4 is a view, on an enlarged scale, taken generally along line 4—4 of FIG. 3.

Referring now to both FIGS. 3 and 4, the centrifugal clutch 66 will be described in more detail. As best seen in FIG. 4, the clutch includes two generally U-shaped jaws 84 and 84'. The jaws are identical so that only one jaw 84 will be described in detail. For example, jaw 84 has two legs, 86 and 88, which are connected by a base 90. One leg 86 is shorter than the other leg 88 and has a lug portion 92 for bearing against the ratcheted surface of core flange 18. The longer leg 88 has one edge 94 which extends beyond the periphery of the drive chuck when the chuck is rotated. This leg also has an opening 96 for purposes set out hereinbelow.

The jaws are slidably carried by the rotating drive chuck so that they can move radially outward under the influence of centrifugal force when the drive chuck is rotated. Also, there is a mass imbalance between the longer and shorter legs so that the two U-shaped jaws 84,84' move radially apart in opposite directions.

The jaws are arranged so that each has its shorter leg 86, 86' extending between the legs of the other. Due to the U-shape of the jaws and the mass imbalance between the longer and shorter legs, the short legs 86 and 86' will move towards each other to close lugs 92, 92' about the core as centrifugal force throws the jaws 84, 84' radially outward when the aft drive chuck rotates. As a safety measure, pins 95, (FIG. 4) on aft drive chuck 34 extend through openings 96, 96'. These pins will prevent U-shaped jaws 84, 84' from being thrown from the chuck should one or another of the shorter legs 86, 86' break while the aft drive chuck is rotating.

The radial motion of the two jaws is limited to diametrically opposite directions by a pair of spaced guides 98 on the aft drive chuck and by the interaction of the two jaws. The spaced guides 98 slidably bear against the outboard surfaces of each jaw base 90 and 90'. In addition, the shorter leg 86 of one jaw slidably bears against the inboard surface of the base 90' of the other jaw. This holds the jaws spaced apart and against the guides so the radial movement of each jaw is, in effect, defined by the guides 98 on the outboard side of the jaws.

Due to the U-shape of the jaws, lugs 92, 92' are disengaged from about the core by moving the two legs 88, 88' together. Such movement is accomplished by a fixed member 76 on the stuffing machine which surrounds the aft drive chuck. This member has an internal cam surface 78.

When it is time to disengage or open the centrifugal clutch 66, rotation of the aft drive chuck is stopped and the chuck moved aft, or to the left as viewed in FIG. 3. The exposed edges 94, 94' of the clutch jaws are engaged against the cam surface 78 by this aft movement and are pinched together. This moves the lugs 92, 92' radially away from the core to clear flange 18 thereby releasing the core.

It should be recognized that if the chuck is stopped with the jaws in a vertical or near vertical position as shown in the figures, one or another of the jaws can move prematurely under the influence of gravity. For example, as illustrated, the short leg 86' of the lower clutch jaw 84' could fall and move lug 92' into a closed position. To prevent such a premature closing, the aft drive chuck has two spring biased detents 80, only one of which is shown in FIG. 3. Each detent bears against a base by leg 90, 90' with sufficient force to hold the U-shaped jaws in a fixed position when the aft drive chuck is not rotating. Thus, the detents will hold jaws 84, 84' until the jaws close under the influence of centrifugal force when aft drive chuck 34 begins to rotate. Thereafter, when rotation stops, detents 80 will hold the jaws in a closed position until the jaws are opened by cam surface 78.

The stuffing apparatus as shown in FIG. 3 also has an end of casing sensor assembly. This sensor assembly includes a follower 82 which is biased against the trailing end of the casing. When follower 82 moves a predetermined distance, thereby indicating that the casing supply is about to be exhausted, a contact 100 is closed. Closing this contact in turn initiates the sequence for stopping both the flow of emulsion and the rotation of the aft drive chuck 34 so that the spent core 12 can be replaced by a core containing a fresh supply of casing.

Operation of follower 82 is controlled by a positioning means generally indicated at 75. This means includes an air cylinder 77 which is fixed to drive rod 54 by a bracket 79.

A bracket extension 79a mounts a coil spring 83. Coil spring 83 is biased between bracket extension 79a and a plate 85. The plate in turn is connected by an angled rod 87 to follower 82. Piston rod 81 extends through a clearance hole in plate 85 and carries a stop 81a as shown in FIG. 3.

Piston 77, when pressurized by the entry of air at port B, retracts the piston rod 81 and stop 81a to move plate 85 against the bias of spring 83. This fixes the follower to the bracket and its extension so that movement of conduit 32 will result in a like movement of the follower 82. Conversely, introducing air through port A extends the piston rod 81 to permit the plate 85 to move with respect to the bracket and its extension responsive to the bias of spring 83. In this fashion, piston 77 and stop 81a act as a lock means to selectively fix and release the follower with respect to bracket 79.

As set out hereinabove, there is a second chuck 36 at the fore end of the stuffing apparatus. This chuck is journaled to a fixed part 37 of the stuffing machine and has a central passage 39 through which the stuffed casing passes. Flutes 43 within this passage grip the stuffed casing and cause it to spin. This allows the linking mechanism as shown in FIG. 2 to operate in a conventional manner.

The inlet end of passage 39 has an emulsion seal 45 which snugs the casing to the core as the casing deshirrs. This prevents the food emulsion, which is being discharged through the core, from back-flowing over the core.

The stuffing machine also includes a carrier for handling casing articles. The carrier, shown schematically at 51 in FIG. 2 moves the casing article to various positions. For example, it receives the casing articles from a supply source and then moves the articles as needed, to a position where the article is in axial alignment between the aft drive chuck 34 and forward chuck 34. After a stuffing operation, which uses up the casing on the article, the carrier moves the empty core to a stripping station where food emulsion remaining in the core is stripped out of the core.

Figure 5:
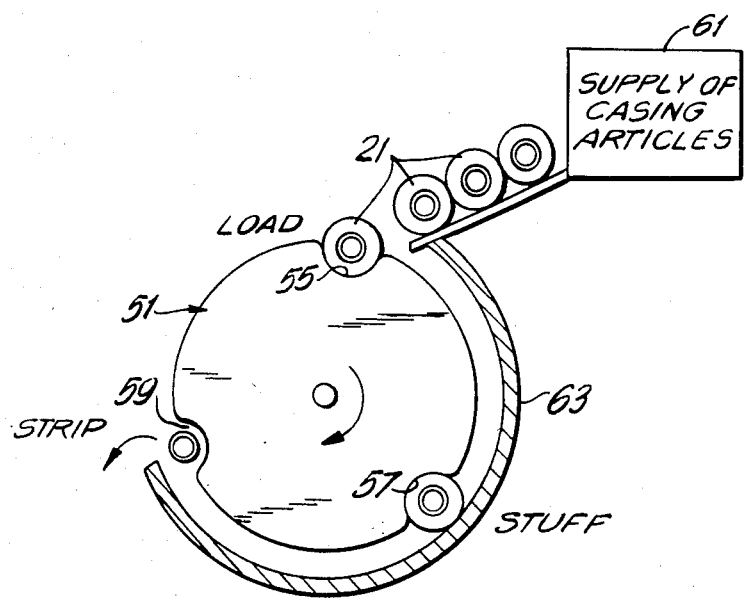
FIG. 5 is schematic representation of a carrier as may be used to position casing articles for stuffing.

FIG. 5 is a schematic representation of a head-on view of a carrier 51. The carrier itself is not part of the present invention and any suitable means may be employed for loading the casing articles onto the stuffing machine and discharging the spent core from the stuffing machine. A detailed description of a preferred carrier is contained in a copending application Ser. No. 481,031. For purposes of the present invention it is sufficient merely to say that the carrier 51, as illustrated, has notches 55, 57 and 59 spaced about its periphery. These notches in the carrier, when oriented as shown in FIG. 5, correspond respectively to the load position, stuff position, and stripping position of FIG. 2. The carrier can rotate, in sequence, between the positions in order to index a casing article from one position to another.

In operation, a casing article 21 is fed from a supply 61 into notch 55. The carrier is then indexed to position notch 55 at the stuff position. At the stuff position the casing article has its longitudinal axis axially aligned with chucks 34 and 36. Suitable guides 63 on the machine help to retain the casing article within the notches as the carrier is indexed to this stuff position. After stuffing of the casing, the carrier is then indexed to position notch 55 at the strip position where food emulsion is stripped from the core by push rod 71 (see FIG. 2).

Completing the construction of the stuffing machine as shown in FIG. 3, are a set of fore and aft clamps 67, 69. These clamps, at different stages of the stuffing operation, close about the casing article and, later, about a spent core. This is done to facilitate first the placement of the casing article into operative association with the rotating chucks 34, 36 and second, the removal of a spent core from the rotating chunks. If desired, a separate floating arm (not shown) can be brought to bear against a casing article in the stuff position to reduce the tendency of the article to whip as the casing article is rotated.

Also, as best seen in FIG. 4, fixed member 76, which surrounds the aft drive chuck 34, has an entry slot 93, a clearance slot 97 and an exit slot 99. These slots are approximately located about the one o'clock, six o'clock and eight o'clock positions when viewing the fixed member headon, as in FIG. 4. FIG. 3 shows that these slots extend rearward along the fixed member. The purpose of entry slot 93 is to permit the aft end 14 of the core to pass through the fixed member 76 when the core is being moved from the load position and into axial alignment with conduit 32 in the stuff position (FIG. 3). Exit slot 99 performs a similar function in that it permits the aft end of the spent core to pass through fixed member 76 when a spent core 12 is being removed from axial alignment with conduit 32. Clearance slot 97 permits the rearward movement of angled rod 87 which carries the follower 82.

The operation of the stuffing apparatus utilizing the casing article 21 now will be described as beginning prior to the time that the casing article is put into stuffing position. At such time, the sliding conduit 32 is in the phantom line position shown in FIG. 3. In this position port 56 is out of alignment with manifold 30 so that no food product flows into the conduit. Also at this time, aft drive chuck 34 is not rotating and the clutch jaws 84, 84' are held open by the operation of detents 80.

Air cylinder 77 is pressurized through port B so that the piston rod 81 is retracted and stop 81a is holding plate 85 against the bias of spring 83. This locates follower 82 to the left of the position shown in FIG. 3 and flush against aft drive chuck 34. Clamps 67, 69 are open so that a casing article can be moved from the load to the stuff position by carrier 51.

Casing article 21 as shown in FIG. 1, is transported by carrier 51 from a supply of such articles to the stuff position wherein the article is positioned between chucks 34 and 36 with the longitudinal axis of the article generally in alignment with the longitudinal axis of the sliding conduit 32. With casing article 21 in this position, clamps 67, 69 are closed about the casing article to hold this axial alignment. The sliding conduit 32 is moved to the right as viewed in FIG. 3 by any suitable means such as a pneumatic cylinder (not shown) acting through drive rod 54.

As conduit 32 moves to the right, the aft end 14 of the core is funneled through tapered inlet 62 and into the discharge 52 of conduit 32. In this way, the conduit picks up the core aft end 14 so that seal 64 at the conduit discharge can engage and slide over the aft end of the core. Movement of the conduit also registers port 56 with manifold 30. Continued movement of conduit 32 towards the right overcomes the friction of closed clamps 67, 69 so that the entire casing article 21 is transported to the right, as viewed in FIG. 3, until the fore end 16 of the tubular core extends into chuck 36.

Clamps 67, 69 are opened and motor 38 is started so that both chucks 34 and 36 begin to rotate in unison. Rotation of the rear drive chuck 34 will activate the centrifugal clutch causing jaws 84, 84' to overcome the holding force of the detents 80. The jaws can slide outwardly under the influence of centrifugal force to engage lugs 92, 92' against the core as described hereinabove.

The pressure in air cylinder 77 is switched from port B to port A. This extends piston rod 81 and causes stop 81a to release plate 85. The plate is now urged forward by spring 83 to seat the follower 82 against the trailing end of the casing as shown in FIG. 3. The follower 82 is now under the influence of spring 83 and is able to track the end of the casing.

When port A is pressurized, emulsion pump 28 (FIG. 2) is started so product can flow from the pump into the conduit 32, and from the conduit discharge 52 directly into the aft end 14 of the tubular core. The introduction of food product into the conduit 32 exerts a pressure on the tubular core which tends to force the casing article 21 to the right, as viewed in FIG. 3. This acts to thrust flange 18 against lugs 92, 92'. With the lugs engaged against the radially and axially disposed abutment surfaces provided by the flange and, in particular, against the ratchet steps 20 of the flange, the aft drive chuck 34 will drive and rotate the cored casing article 21. This driving engagement can be enhanced by having the profile of lugs 92, 92' match the profile of ratchet steps 20. If desired, a portion of clamps 67, 69 may be arranged to float against the casing article in order to prevent the article from whipping as it rotates.

It also should be noted that the jaws 84, 84' of the centrifugal chuck act as a thrust bearing and take up the force exerted on the core by the food emulsion being pumped through the core. This prevents the fore end 16 of the core from being forced too far forward into the forward chuck 36. However, as a safety feature, rib 19 adjacent to the fore end 16 of the tubular core, preferably, is large enough to prevent the emulsion pressure from forcing the core through emulsion seal 45 and passage 39 should there be a failure of core flange 18 or of a jaw member 84, 84'.

As the food product is forced through the tubular core body 12, it unseats plug 26 (FIG. 1) from within the bore. Food product now enters the casing. As the casing fills with food product, the casing deshirrs from the casing supply 22 and exits through the passage 39 in the rotating chuck 36 at the fore end of the stuffing machine as shown in FIGS. 2 and 3.

As the casing deshirrs, it is snugged to the core by emulsion seal 45 and moves longitudinally between the core and the emulsion seal.

Flutes 43 within chuck 36 grip and rotate the stuffed casing, as is conventional, so that the rotating stuffed casing, which passes through chuck 36, can be formed into links by a conventional linking mechanism shown at 48 in FIG. 2.

The stuffing of casing 22 to produce the encased product, and the subsequent linking of this product continues until the supply of casing contained in strand 22 is exhausted. When this occurs, follower 82 moves a sufficient distance so that contact 100 is closed. Closing contact 100 issues a signal to indicate that the supply of casing is near to exhaustion so that an appropriate control means (not shown) can operate to initiate the shutdown of pump 28.

The presence of rib 15 (FIG. 1), which prevents movement of the shirred anchor portion 27 along the core, insures that any movement of the casing trailing end is a true indication of casing run out. Accordingly, the movement of this trailing end, as sensed by the means shown or by another appropriate end-of-casing sensor, can be relied upon to initiate termination of the stuffing operation.

After pump 28 is shut down, motor 38 is turned off. Pressure in air cylinder 77 is switched to port B to retract the piston rod 81 and stop 81a. Stop 81a contacts plate 85 and moves the plate against the bias of spring 83 so that the follower 82 is retracted against clutch 34. The follower is now fixed to move in concert with sliding conduit 32. Clamps 67, 69 are reapplied about the core 12 which is now bare of casing. The sliding conduit 32 is withdrawn to the phantom line position, as shown in FIG. 3. This withdrawing movement of the conduit 32 pulls the drive chuck 34 and empty core 12 against the friction of closed clamps 67, 69 and to the left, as viewed in FIG. 3, until the fore end 16 of the core is free of forward chuck 36. Moving the drive chuck to the left eventually brings the outer edges 94, 94' of the centrifugal clutch 66 against cam surface 78. The cam surface pinches these edges together and forces the clutch jaws 84, 84' to open thereby releasing flange 18.

Thereafter, with clamps 67, 69 still in position against the core, the withdrawing movement of conduit 32 causes the aft end 14 of the core to pull free from the aft drive chuck 34 and disengage from the conduit 32. With this disengagement accomplished, clamps 67, 69 are released and the spent tubular core 12 is moved by carrier 51 (FIG. 5) to the strip position while a fresh casing article is moved, by carrier 51, to the stuff position.

Referring again to FIG. 2, it is seen that at the strip position, push rod 71 is inserted through a spent core 12' for purposes of expelling any food emulsion remaining in the core. This emulsion is collected in a container 73 and recycled through the stuffing process.

Thus, it should be appreciated that the present invention provides a novel casing article including a core member and a casing strand carried on the core. This core improves the resistance of the casing strand to breakage when subjected to the rigors of both manual handling and handling by an automatic stuffing apparatus. The core can be utilized as the stuffing horn as described herein, or in the alternative, it can be located over the stuffing horn of a stuffing machine appropriately modified to handle such cored casing articles. In either event, the core will be a disposable, one use, item.

The core member 10 has an engagement means on the aft end 14. As described hereinabove, the engagement means is a flange 18, including the ratchet steps 20. Those skilled in the art will understand that the engagement means could have alternate configurations.

Also described herein is an apparatus and method for utilizing the novel casing article in the automatic production of encased products such as frankfurters and the like. In this respect the apparatus provides a novel drive chuck for engaging, centering, and spinning the cored casing article about its longitudinal axis. It also provides the necessary seal means at both the fore and aft ends of the casing article, which allow the introduction of food product into the core, and from the core into the casing.

The spring biased end-of-casing sensor as disclosed herein, is self adjusting in that it automatically locates and fixes on the trailing end of the casing when the casing article is mounted to the stuffing apparatus. The spring bias maintains the sensor against the trailing end of the casing and allows the sensor to track this trailing end so that shutdown of the stuffing operation will not be initiated until the casing supply is exhausted.

As mentioned herein above the preferred shirring method is the subject of U.S. Pat. No. 3,779,284. As disclosed in U.S. Pat. No. 3,779,284, the shirred stick has a repetitive succession of zones throughout its length. In one zone the pleats are rotationally displaced in one direction and then, in another zone, the pleats are rotationally displaced in the opposite direction. Between these two zones is a third, transitional zone, in which there is no rotational displacement of the pleats. This permits the casing to deshirr without twisting about the rotating core.

Having thus described the invention in detail, what is claimed as new is:

1. An elongated substantially rigid tubular core for supporting a shirred casing on a stuffing machine of the type having a rotary drive operable during stuffing of the casing, said tubular core comprising:
   (a) fore and aft ends with said aft end being releasably connectable to a foodstuff discharge outlet of the stuffing machine to receive foodstuff pressed through the outlet for passage through said tubular core;
   (b) a flange on said tubular core adjacent said aft end, said flange having a side surface extending generally upright to the longitudinal axis of said tubular core; and
   (c) drivable means on said side surface engagable by the rotary drive of the stuffing machine for rotatably driving said tubular core about its longitudinal axis.

2. A tubular core as in claim 1 wherein said side surface of said flange faces forward towards said tubular core fore end.

3. A tubular core as in claim 1 or 2 wherein said drivable means comprises a plurality of ratchet steps on said side surface, each ratchet step having an abutment surface engagable with the rotary drive of the stuffing machine.

4. A tubular core as in claim 1 including a shirred casing stick carried by said core an arranged for deshirring towards said fore end, said shirred casing stick having the pleats thereof in sufficient gripping contact with said tubular core over substantially the full length of said shirred casing stick to resist relative motion therebetween so that rotatably driving said core will produce co-rotation of said shirred casing stick.

5. A tubular core as in claim 4 wherein an unshirred portion of said casing stick is arranged over said fore end and forms a plug of casing material releasably positioned within the fore end of said core.

6. A tubular core as set out in claim 1 including restraining means on said core forward of said flange and engagable against a shirred casing stick carried by said core to restrain a shirred portion of the stick disposed behind said restraining means from moving longitudinally along said core towards said fore end responsive to deshirring of casing from a shirred portion of said shirred stick disposed forward of said restraining means.

7. A cored casing article for use in the production of encased food products such as frankfurters and the like, said article comprising:
   (a) a tubular core having an aft end and a fore end;
   (b) a flange on said core adjacent said aft end extending circumferentially about said core, said flange having a radially extending upright surface and drivable means on said upright surface releasably engagable by a rotary drive of a stuffing machine to rotate said core about its longitudinal axis; and
   (c) a shirred casing stick on said core forward of said flange and arranged for deshirring in a direction towards the fore end of said core, said stick and core being in sufficient contact over substantially the full length of said stick to resist relative motion therebetween so that said core and shirred casing stick thereon rotate as a unit.

8. A shirred casing article as in claim 7 wherein said drivable means comprises a plurality of ratchet steps on said side surface presenting abutment surfaces engagable by the stuffing machine rotary drive.

9. A casing article as in claim 7 wherein said casing stick has an unshirred portion extending over said fore end forming a plug of casing material disposed within the bore of said tubular core at said fore end.

10. A casing article as in claim 7 including restraining means on said core engaging said shirred casing stick for restraining a shirred portion of said stick lying between said restraining means and said flange from moving longitudinally along said core responsive to the deshirring of casing from a shirred portion of said stick lying forward of said restraining means.

11. A casing article as in claim 7, wherein said aft end of said core is releasably connectable with the discharge outlet of a stuffing machine and the fore end of said core is receivable in releasable engagement with a rotating chuck of a stuffing machine spaced axially forward of the discharge outlet.

12. A casing article as in claim 7 wherein said drivable means is on an upright side surface of said flange which faces towards said fore end and the engagement of the rotary drive of the stuffing machine against said drivable means comprises means to prevent axial forward movement of said core responsive of the passage of a food emulsion into said aft end from the discharge of a stuffing machine.

13. A cored casing article for use in the production of encased food products such as frankfurters and the like, said article comprising:
 (a) a substantially rigid tubular core having an aft end and a fore end;
 (b) said aft end being adapted for releasable communication with an outlet of a stuffing machine;
 (c) a flange on said core adjacent said aft end, said flange having a surface which is upright with respect to the longitudinal axis of said tubular core and ratchet steps formed in said surface which define engaging means for receiving there against a rotary drive member of a stuffing machine to rotate said casing article about its longitudinal axis; and
 (d) a shirred casing stick on said core forward of said flange, said shirred casing stick having pleats throughout its length which grip about said core so said casing stick and core co-rotate, and said pleats being arranged for deshirring in a direction towards said fore end.

14. A cored casing article as in claim 13 wherein said shirred casing includes an unshirred portion extending over said fore end and formed into a plug which is disposed with the bore of said tubular core.

15. A cored casing article as in claim 13 wherein said flange is oriented in a plane generally perpendicular to the longitudinal axis of said tubular core, and said ratchet steps each presenting an abutment surface to receive thereagainst the rotary drive member of the stuffing machine.

16. A cored casing article as in claim 13 including a rib on said core engaging against an aft position of said shirred casing stick for restraining said aft portion of said shirred casing stick disposed between said rib and said flange from moving longitudinally along said core responsive to the deshirring of casing from a portion of said shirred casing stick forward of said rib.

17. A cored casing article as in claim 13 including a rib on said core adjacent said fore end said rib providing a stop to prevent longitudinal movement of said core through a rotatable drive chuck positioned around said fore end, wherein said longitudinal movement is responsive to the flow of a food emulsion introduced into said aft end and passing through said core.

18. A shirred casing article comprising:
 (a) an elongate substantially rigid and uniformly cylindrical tube forming throughout its length a straight cylindrical passageway for conducting foodstuff through it into, and thus filling, a length of flexible tubular casing to be extended from said tube;
 (b) fixed coaxially onto said tube a shirred and longitudinally compacted length of said casing, the pleats of which grip onto and resist displacement relative to said tube so as to be rotatable with it as a unit by rotation of said tube;
 (c) a fore end portion of said casing length being extended forward from said pleats over the adjacent, fore end of said tube to receive foodstuff passed through the tube and thus to deshirr and draw forward the casing of said pleats during the filling of said casing length;
 (d) the aft end of said tube being connectable in alignment with a delivery outlet of a stuffing machine to receive foodstuff pressed through the outlet;
 (e) said tube having on an aft end portion thereof behind said pleats a part drivable about the longitudinal axis of said tube to rotate the tube, the pleats thereon, and said casing fore end portion about said axis during deshirring and filling of said casing length by foostuff passed through said tube; and
 (f) said drivable part comprising an annular flange extending circumferentially about said aft end portion having a radially extending side face and presenting on said side face of said flange at least one radially and axially disposed abutment surface for drivable engagement with a radially disposed driving element rotatable about said axis.

19. A shirred casing article according to claim 18, said tube being composed of a moldable polymeric material formed to a substantially uniform wall thickness throughout the tube length.

20. A shirred casing article comprising:
 (a) an elongated substantially rigid straight cylindrical tube which throughout its length has a substantial uniform inside diameter and forms a straight cylindrical passageway for conducting foodstuff through it into and thus filling a length of flexible tubular casing to be extended from said tube;
 (b) fixed coaxially onto said tube a shirred and longitudinally compacted length of said casing the pleats of which along said compacted length grip onto and resist displacement relative to said tube so as to be rotatable with it as a unit by rotation of said tube;
 (c) a fore end portion of said casing length being extended forward from said pleats over the adjacent, fore end of said tube to receive foodstuff passed through the tube and thus to deshirr and draw forward the casing of said pleats during the filling of said casing length;
 (d) the aft end of said tube being connectable in alignment with a delivery outlet of a stuffing machine to receive foodstuffs pressed through the outlet;
 (e) said tube having on an aft end portion thereof behind said pleats a part drivable about the longitudinal axis of said tube to rotate the tube, the pleats thereon, and said casing fore end portion about said axis during deshirring and filling of said casing length by foodstuff passed through said tube;
 (f) said tube having on a forward portion thereof at a location in front of said pleats a rigid forward elevation that protrudes radially outward from the outer cylindrical surface of said tube to a diameter sufficient to inhibit forward displacement of said pleats.

21. A shirred casing article according to claim 20, said tube being composed of a moldable polymeric material formed to a substantially uniform wall thickness throughout the tube length, and said forward elevation being an annular ridge formed by an outward protrusion of the wall of said tube.

22. A shirred casing article according to claim 20, said tube having on a backward portion thereof at a location spaced a distance ahead of the aft end of said pleats a rigid aft elevation that protrudes radially outward from said outer cylindrical surface into a pleated portion of said casing length so as to inhibit forward displacement of casing pleats from an aft group of said pleats.

23. A shirred casing article according to claim 22, said tube being composed of a moldable polymeric material formed to a substantially uniform wall thickness throughout the tube length and said aft elevation being an annular ridge formed by an outward protrusion of the wall of said tube.

24. A shirred casing article according to claim 20, 21, 22, or 23
the diameter of said forward elevation being sufficient to prevent said tube from being displaced axially forward into the casing gripping elements of a rotatable chuck device employed for linking said casing as it is filled and extended forward from said tube.

25. A shirred casing article according to claim 18, 19, 20, 21, 22 or 23
the fore end of said pleats being spaced a distance backward from said fore end of said tube so that an annular air space is provided between said tube and said fore end portion of said casing.

26. A shirred casing article comprising:
(a) an elongate substantially rigid straight cylindrical tube forming throughout its length a straight cylindrical passageway for conducting foodstuff through it into, and thus filling, a length of flexible tubular casing to be extended from said tube; said tube being composed of a moldable polymeric material formed to a substantially uniform wall thickness throughout the tube length;
(b) fixed coaxially onto said tube a shirred and longitudinally compacted length of said casing the pleats of which grip onto and resist displacement relative to said tube so as to be rotatable with it as a unit by rotation of said tube;
(c) an unshirred portion of said casing length being extended forward from said pleats over the adjacent, fore end of said tube to receive foodstuff passed through the tube and thus to deshirr and draw forward the casing of said pleats during the filling of said casing length;
(d) the aft end of said tube being connectable in alignment with a delivery outlet of a stuffing machine to receive foodstuff pressed through the outlet;
(e) said tube having on an aft end portion thereof between said aft end and said pleats a part drivable about the longitudinal axis of said tube to rotate the tube, the pleats thereon, and said casing fore end portion about said axis during deshirring and filling of said casing length by foodstuff passed through said tube;
(f) said drivable part comprising a radial annular flange extending circumferentially about said aft end portion and presenting on the forward side face of said flange at least one radially and axially disposed abutment surface for drivable engagement with a radially disposed driving element rotatable about said axis;
(g) said tube having on a forward portion thereof at a location in front of said pleats and spaced backward from said tube fore end a rigid forward elevation that protrudes radially outward from the outer cylindrical surface of said tube to a diameter sufficient to inhibit forward displacement of casing pleats;
(h) said tube having in a backward portion thereof at a location spaced a substantial distance ahead of the aft end of said pleats a rigid elevation that protrudes radially outward from said outer cylindrical surface into a pleated portion of said casing length so as to inhibit forward displacement of casing pleats from an aft group of said pleats;
(i) each of said elevations being an annular ridge formed by an outward protrusion of the wall of said tube; and
(j) the fore end of said pleats being spaced backward from said fore end with a portion of said unshirred casing contacting said tube fore end so that a substantially closed annular air space of substantial length is provided between the tube and said unshirred portion of said casing.

27. A stuffing tube element for a shirred casing article comprising:
(a) an elongate substantially rigid and uniformly cylindrical tube composed of moldable polymeric material and throughout its length formed to a substantially uniform wall thickness and forming a straight cylindrical passageway for conducting foodstuff through it into and thus filling a length of flexible tubular casing to be extended from said tube;
(b) said tube being adapted to hold fixed coaxially onto it a shirred and longitudinally compacted length of said casing with the pleats thereof gripping onto and resisting displacement relative to said tube and with a fore end portion of the casing length extended forward from said pleats over the adjacent, fore end of the tube to receive foodstuff passed through the tube;
(c) the aft end of said tube being connectable in alignment with a delivery outlet of a stuffing machine to receive foodstuff pressed through the outlet;
(d) said tube having on an aft end portion thereof near but ahead of said aft end a part drivable about the longitudinal axis of said tube to rotate the tube, said pleats thereon, and a said casing fore end portion about said axis during deshirring and filling of said casing length by foodstuff passed through the tube; and
(e) said drivable part comprising an annular flange extending circumferentially about said aft end portion and presenting on a radially extending side face of said flange at least one radially and axially disposed abutment surface for drivable engagement with a radially disposed driving element rotatable about said axis.

28. A stuffing tube element for a shirred casing article, comprising:
(a) an elongate substantially rigid straight cylindrical tube which throughout its length has a substantially uniform outside diameter and forms a straight cylindrical passageway for conducting foodstuff through it into and thus filling a length of flexible tubular casing to be extended from said tube;
(b) said tube being adapted to hold fixed coaxially onto it a shirred and longitudinally compacted length of said casing with the pleats thereof gripped onto and resisting displacement relative to said tube and with a fore end portion of the casing length extended forward from said pleats over the adjacent fore end of the tube to receive foodstuff passed through the tube;
(c) the aft end of said tube being connectable in alignment with a delivery outlet of a stuffing machine to receive foodstuff pressed through the outlet;

(d) said tube having on an aft end portion thereof near but ahead of said aft end a part drivable about the longitudinal axis of said tube to rotate the tube, said pleats thereon, and a said casing fore end portion about said axis during deshirring and filling of said casing length by foodstuff passed through the tube; and (e) said tube having on a forward portion thereof at a location spaced backward from said tube fore end a rigid forward elevation that protrudes radially outward from the outer cylindrical surface of said tube to a diameter sufficient to inhibit forward displacement of said casing pleats.

29. A stuffing tube element according to claim 28

(a) said tube having on a backward portion thereof at a location spaced ahead of the location thereon for the aft end of said pleats a rigid aft elevation that protrudes radially outward from said outer cylindrical surface sufficiently to protrude into a pleated portion of a said casing length and thus inhibit forward displacement of casing pleats from an aft group of said pleats;

(b) said drivable part comprising a radial annular flange extending circumferentially about said aft end portion and presenting on a radially extending side face of said flange at least one radially and axially disposed abutment surface for drivable engagement with a radially disposed driving element rotatable about said axis; and (c) said tube having on a forward portion thereof at a location spaced backward from said tube fore end and in front of the location for the fore end of said pleats a rigid forward annular ridge formed by an outward protrusion of the wall of said tube and sufficiently greater in diameter than the outer cylindrical surface of said tube to inhibit forward displacement of casing pleats;.

* * * * *